Figure 1:
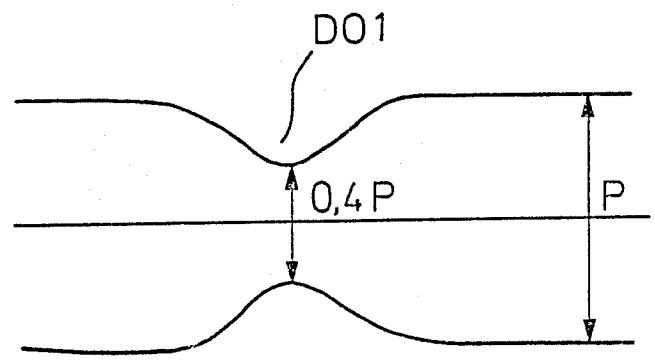

United States Patent [19]

Felleisen et al.

[11] Patent Number: 4,754,222

[45] Date of Patent: * Jun. 28, 1988

[54] METHOD FOR DETECTING AND EVALUATING DROPOUTS IN RECORDING MEDIA HAVING DIGITAL SIGNALS RECORDED THEREON

[75] Inventors: Peter Felleisen, Lampertheim; Aribert Krug, Achern; Peter Grosshans, Offenbach, all of Fed. Rep. of Germany

[73] Assignee: BASF Aktiengesellschaft, Ludwigshafen, Fed. Rep. of Germany

[*] Notice: The portion of the term of this patent subsequent to Apr. 7, 2004 has been disclaimed.

[21] Appl. No.: 947,178

[22] Filed: Dec. 29, 1986

Related U.S. Application Data

[62] Division of Ser. No. 540,385, Oct. 11, 1983, Pat. No. 4,656,420.

[30] Foreign Application Priority Data

Oct. 14, 1982 [DE] Fed. Rep. of Germany ....... 3238077

[51] Int. Cl.[4] .................. G01R 33/12; G11B 27/36
[52] U.S. Cl. .................................. 324/212; 360/31
[58] Field of Search ............. 324/210, 211, 212; 358/314, 336; 360/31; 371/25, 64, 65

[56] References Cited

U.S. PATENT DOCUMENTS

| | | | |
|---|---|---|---|
| 3,185,922 | 5/1965 | Wherry | 324/34 |
| 3,288,986 | 11/1966 | Muto | 235/92 |
| 3,522,525 | 8/1970 | Cottin et al. | 324/34 |
| 3,525,930 | 8/1970 | Hodge | 324/34 |
| 3,562,635 | 2/1971 | Parker | 324/34 |
| 3,659,185 | 4/1972 | Gregorich | 321/2 |
| 3,659,195 | 4/1972 | Cardozo et al. | 324/34 TA |
| 3,717,846 | 2/1973 | Kanda et al. | 340/146.1 F |
| 3,826,975 | 7/1974 | Geller | 324/34 |
| 4,146,099 | 3/1979 | Matsushima et al. | 371/65 |

Primary Examiner—Reinhard J. Eisenzopf
Assistant Examiner—Walter E. Snow
Attorney, Agent, or Firm—Keil & Weinkauf

[57] ABSTRACT

A method and circuit arrangements for detecting and evaluating dropouts or drop-ins on recording media, comprising reading and modifying the recorded digital signals, the size and type of fault being evaluated on the basis of fixed threshold levels. In the case of a dropout, for example, the fault is weighted by determining the differential of the envelope of the read signal. In the case of a drop-in, other noise signals are left out of consideration by nonlinear emphasis of the drop-in and appropriate choice of the threshold value. A circuit combination enables both dropouts and drop-ins to be detected and evaluated.

4 Claims, 5 Drawing Sheets

METHOD FOR DETECTING AND EVALUATING DROPOUTS IN RECORDING MEDIA HAVING DIGITAL SIGNALS RECORDED THEREON

This is a division, of application Ser. No. 6,540,385 filed Oct. 11, 1983, allowed Oct. 1, 1986, now U.S. Pat. No. 4,656,420.

The present invention relates to a method and circuit arrangements for detecting and evaluating faults in recording media particularly magnetic data recording media, having digital signals recorded on one or more tracks.

More and more data are having to be recorded on a smaller and smaller area of the magnetic layer, so that less and less space is available for recording a single bit. The production of magnetic layers for data recording which are absolutely free of faults is extremely difficult and would consequently make the recording medium very expensive because the yield would be so low. For these reasons, methods and circuits for blanking out errors or for error correction are extensively used in digital data recording. For example, magnetic disk packs or magnetic disk cassettes are pre-recorded by the manufacturer with information on defects, ie. o on the location and duration thereof. If the defects are so large that they cannot be corrected by means of error correcting codes (ECC), either the area around the defect can be provided with an inhibit signal (error skipping) or whole tracks on a magnetic disk can be skipped and replaced by alternative tracks.

The most widely used method for detecting such defects is the measuring of dropouts (or missing pulses) and drop-ins (or extra pulses). Methods and electronic circuits for measuring dropouts are disclosed in U.S. Pat. Nos. 3,185,922, 3,288,986, 3,522,525, 3,659,195 and 3,826,975 all of which are based on the following technique: a saturating signal is first recorded at a constant level on the medium to be tested and is then read in a second operation. Each drop in strength of a read signal below a predetermined threshold is called a dropout. The test methods laid down in the international standards (DIN, ECMA and ISO) identify a drop in the read signal amplitude of about 50% of the test signal amplitude as an error (dropout). The magnitude of the drop in signal strength is thus a criterion for the seriousness of the fault. The second criterion used in all conventional methods is the duration of the fault.

A second conventional test method is concerned with the detection of drop-ins. A spurious signal read from a DC-erased medium, which signal stands out from the ever present noise level and normally has an amplitude which is 30% to 40% of the nominal read signal amplitude, is referred to as a drop-in. The disadvantage with the conventional drop-in test method, however, is the low ratio of the drop-in signal level to the tape noise level, i.e. a signal/noise ratio of only 4 to 9 db.

U.S. Pat. Nos. 3,562,635 and 3,717,846 describe variations of another conventional standardized test method. According to the first U.S. Patent, the medium is first DC saturated and then subjected to DC magnetization in the opposite direction which produces a gradient of magnetization through the tape, the magnetization being strongest near the surface and becoming weaker further into the tape, the object being to detect even very small defects. In the second U.S. Patent, the area surrounding a drop-out is DC-erased and the erasing time is measured as a fault criterion.

In conventional testing, dropouts and/or drop-ins are regarded as errors which are taken into consideration when corrections are made (blanking out or track skipping and replacement) and are evaluated accordingly.

However, both defect detecting methods have fundamental and technical disadvantages, as discussed below.

In digital saturation recording, the information (logic 1 or logic 0) is represented during the writing operation by the presence or absence of a flux change in a specific position and hence, during the reading operation, not by the amplitude of the signal, but by the position of the peak of the read signal as a function of time. For this reason, for the purpose of data decoding, the read signal is differentiated and then the position of the zero crossovers of the differentiated signal, i.e. of the peaks of the non-differentiated signal, is evaluated. It is thus clear that a dropout in the form of a drop in the read signal amplitude of, for example, 50% does not interfere with the decoding operation as long as this is not coupled with a time-dependent displacement of the signal peak.

On the other hand, as will be explained at the beginning of the description given below of an illustrative embodiment, drop-outs with a very low write/read error probability are detected, but others with a high write/read error probability are not.

One solution to the problem, as applied in practice, is to record known data and to compare them again with the original data after reading and decoding. However, this method is very time-consuming since the error may or may not appear in different data patterns and writing operations. The reason for this is that the error is recorded on the medium at different points, either because the data patterns are different or because the speed of the medium varies slightly. In this method 10 to 20 write/read operations have to be carried out to examine one portion of the recording medium for errors, which means that the testing procedure takes from 10 to 20 times as long as other conventional methods.

U.S. Pat. No. 3,659,195 discloses a testing apparatus wherein the scanned signal, consisting of the original test signal on which pulses caused by defects in the tape have been superimposed, is fed to threshold detectors, the response thresholds of which are set at fixed levels. This conventional apparatus, however, is used for testing audio (analog recorded) tapes for defects, the depth and duration of the defect being determined because in analog recording the information is represented by the amplitude of the recorded signal, ie. the loudness. The depth and duration of the defect together produce a pulse which is superimposed on the test signal, the pulse being an indication of the seriousness of the defect. The perception limit of the human ear for defect durations in music signals is less than 10 msec., irrespective of the depth of the defect. Defects of a duration of less than 10 msec are therefore not experienced as annoying disturbances and are not indicated. This conventional apparatus for testing audio tapes cannot without an inventive contribution, be used for detecting faults in digital recording media where the duration of the fault must be based on the duration of the recorded signals. Methods for measuring drop-ins are little known.

An object of the present invention is to provide a method of detecting and evaluating faults in data recording media, and circuit arrangements for carrying out the novel method, faults of short duration and faults highly likely to cause write/read errors being detected more rapidly and more reliably.

We have found that his object is achieved, according to the invention, if the digital signals are read and rectified with the formation of an envelope, and the envelope is differentiated, the magnitude of the differentiated signal, which serves as a criterion for the seriousness of the fault, being registered.

It is thus possible to evaluate drop-outs with great accuracy.

In a practical embodiment of the novel method, the envelope is differentiated and the differentiated pulses are fed to a threshold detector for evaluation. The differential of the envelope serves as an error criterion, since, as we have surprisingly found, the envelope has much greater significance for dropouts than the loss in signal strength caused by the dropout. It is therefore advantageous to accurately determine the shape of the envelope in order to be able to evaluate the size and type of dropout.

In order to detect dropouts having a very small signal/ noise ratio, the non-differentiated read signal can be directly fed to another threshold detector.

In another embodiment of the method according to the invention, the differential of the envelope is determined by comparing the amplitudes of successive pulses, and evaluated to determine the size of the dropout.

It is of advantage for the detection and evaluation of drop-ins if the noise signal of a track which has been erased by a DC field is read, and the read signal is amplified as a function of the amplitude and fed to a threshold detector. Advantageously, the read signal is amplified non-linearly, preferably exponentially. Signals of smaller amplitude, based on a threshold value, are amplified to a smaller extent and those of larger amplitude to a greater extent.

In yet another embodiment, the two procedural steps for detecting and evaluating dropouts and drop-ins can be carried out successively in a combined circuit.

In a circuit arrangement according to the invention for evaluating dropouts, the read circuit comprises, in the following order, a read amplifier, a rectifier, a peak rectifier, and a low-pass filter for smoothing the rectified signal, and, for the purpose of obtaining a differentiated signal a differentiating circuit, the output of which is connected to an adjustable threshold detector. The threshold detector advantageously has a large number of threshold stages to whose inputs the differentiated signal is supplied in parallel.

To also detect and evaluate relatively long, but deep dropouts, a further threshold detector, to which the non-differentiated read signal is supplied, can be connected in parallel with the branch of the read circuit in which the differentiated signals are generated, the outputs of the two branches being connected to a common OR-gate.

In a novel circuit arrangement for drop-in detection, the read circuit for the DC noise signal contains a non-linear read amplifier, to the output of which a threshold detector with an adjustable threshold stage is connected.

In this circuit arrangement, the non-linear amplifier amplifies the signal as a function of its amplitude and preferably amplifies it exponentially.

In a particularly advantageous combination of the individual circuit arrangements according to the invention, the read amplifier can be followed by the following branches connected in parallel:

(a) a dropout detecting and evaluating circuit in which the differentiated signals are produced, and a threshold detector for the non-differentiated read signal connected in parallel with said circuit, the outputs of the circuit and the detector being connected to a common OR-gate;

(b) a drop-in detecting branch consisting of a non-linear, preferably exponential, amplifier and a threshold detector connected in series, the outputs of the branches (a) and (b) being optionally connected to a common OR-gate.

Figure 2:
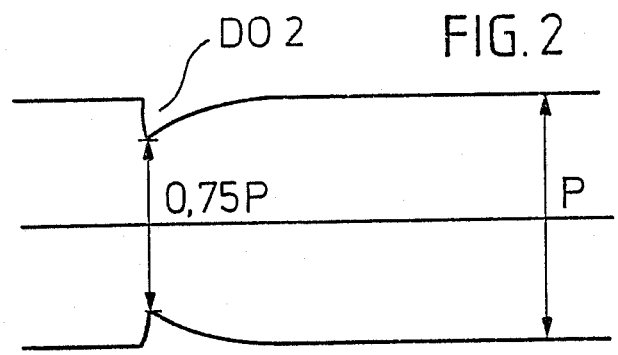
Figure 3:
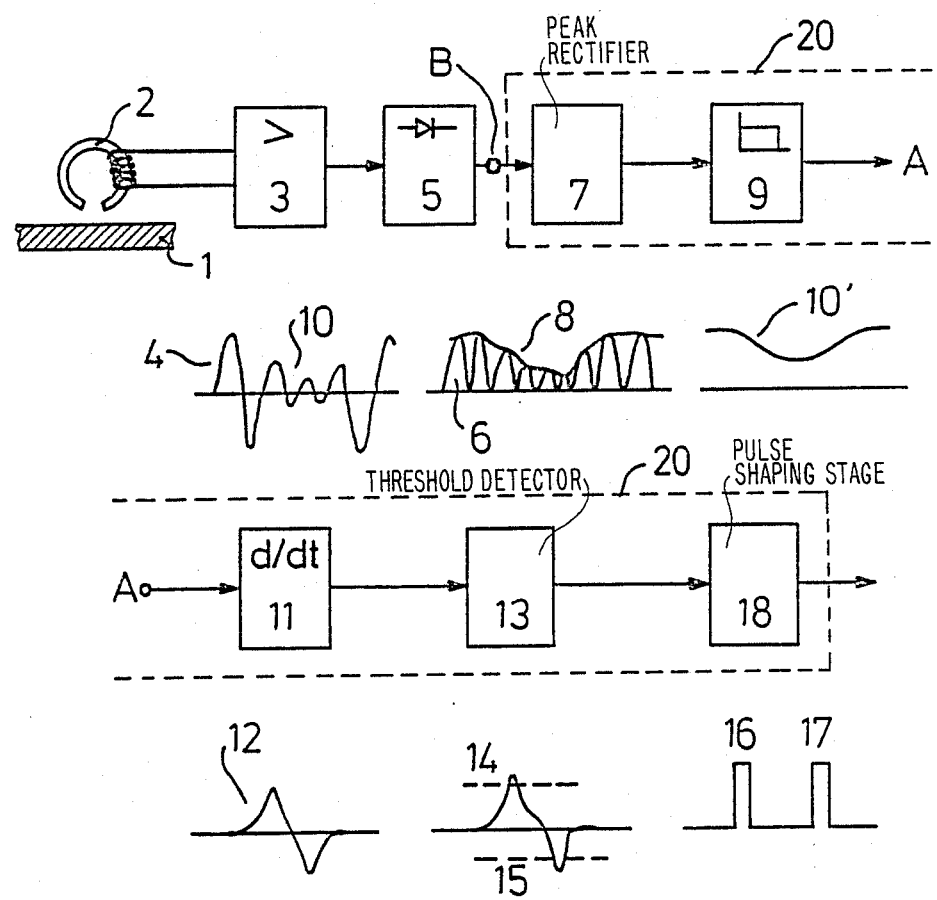
Figure 4:
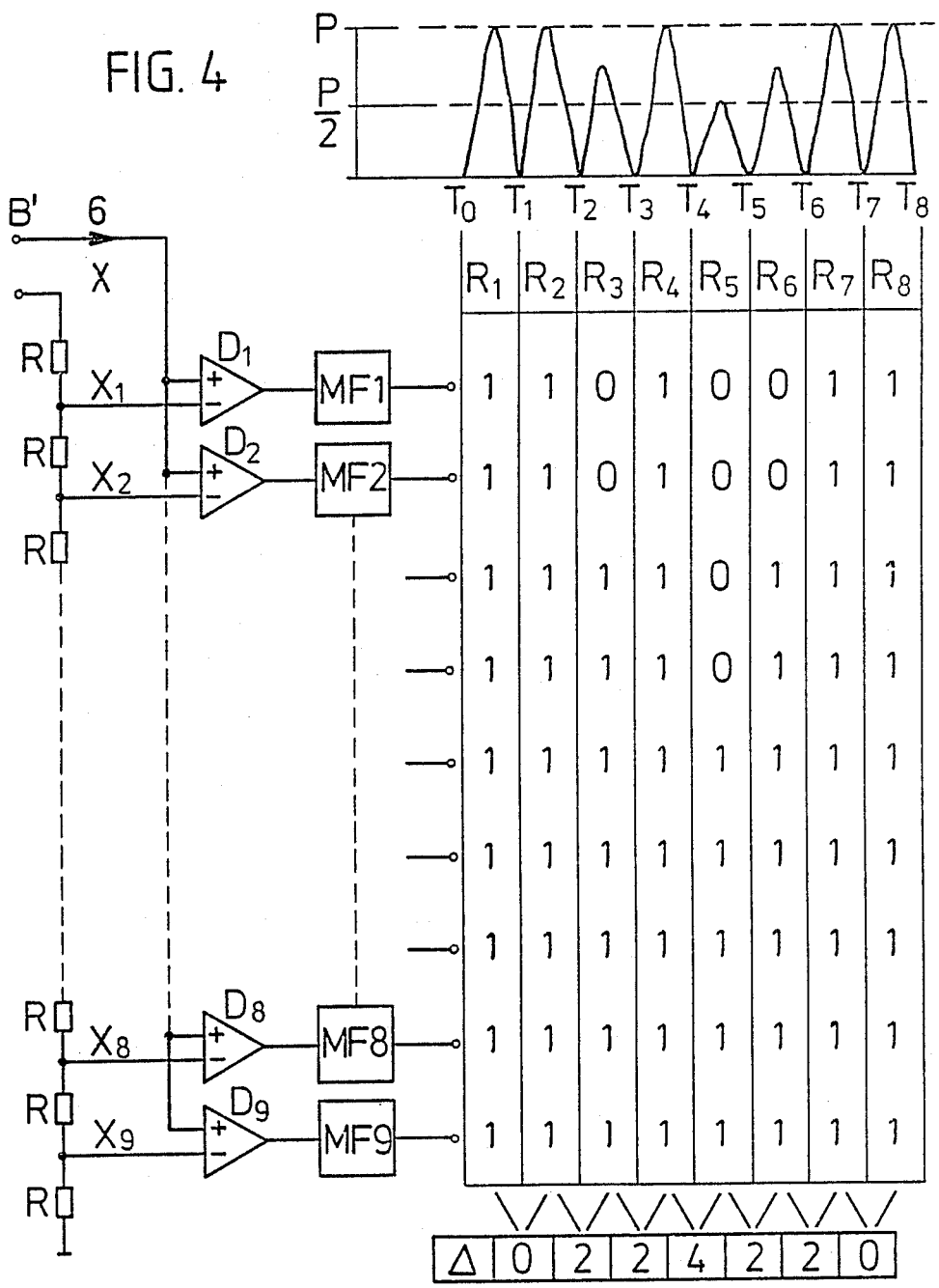
Figure 5:
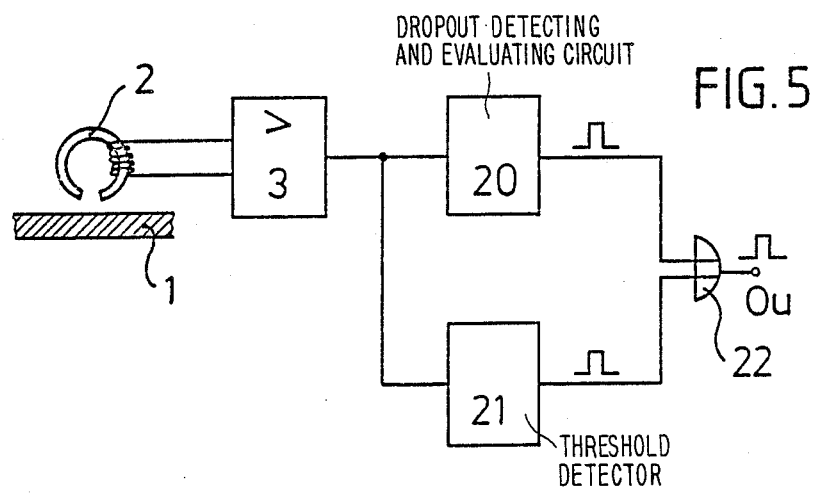
Figure 6:
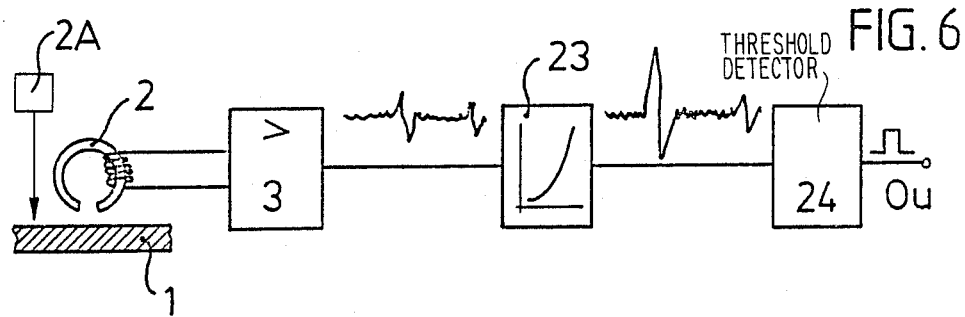
Figure 7:
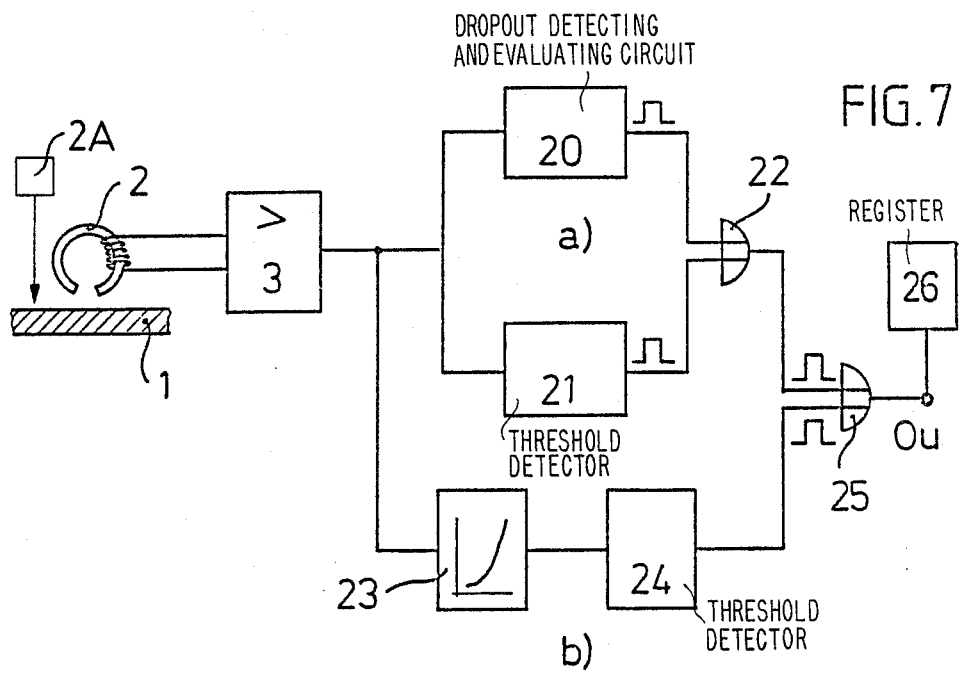

Embodiments of the invention will now be described, by way of example, with reference to the following drawings, in which FIGS. 1 and 2 show typical dropout waveforms in a read signal, FIG. 3 shows a first circuit arrangement for dropout detection and evaluation in accordance with the present invention, with sketches of the respective associated characteristic waveforms, FIG. 4 shows a basic diagram of a circuit according to the invention for evaluating the differentiated signal, FIG. 5 is a schematic of a further circuit arrangement according to the invention for dropout evaluation, FIG. 6 shows a circuit arrangement according to the invention for drop-in evaluation, and FIG. 7 shows a combined circuit arrangement according to the invention for dropout and drop-in evaluation.

FIG. 1 shows a first dropout (DO1) which frequently occurs in data recording, but less frequently results in write/read errors even though the signal strength drops to 40% of the nominal signal level P at the location of DO1. A second typical dropout (DO2) is shown in FIG. 2. This type often results in write/read errors even though there is only a relatively small drop in signal strength (25% of the nominal signal level P) at the location of DO2. In conventional methods, DO1 is detected as a dropout but DO2 is not. However, there is a practical need to detect DO2 rather than DO1, which can be disregarded, or to detect both types of dropout.

Referring now to FIG. 3, saturation-recorded data are read from a recording medium 1 by a magnetic head 2 and are amplified in a first stage 3. Assuming that there is a fault, for example a scratch in the magnetic layer, in the track being scanned, the read signal 4 will have a dropout 10. The more or less sinusoidal signal is subsequently rectified by means of the rectifier 5 (cf. signal 6) and further processed in a peak rectifier 7, to the output of which is connected a low-pass filter 9 which acts as a signal shaper, i.e. which smooths the signal 8, and supplies a DC signal 10' (smoothed rectified signal) which approximately represents the contour of the dropout 10. Since we have found that relatively long or shallow dropouts hardly affect coding or decoding but that deep dropouts have a marked effect on these operations, this smoothed rectified signal 10' is therefore subsequently differentiated in a differentiating circuit 11 in order to obtain a signal 12 (differentiated signal) which represents the gradient or rate of change of the dropout 10. The seriousness of the fault is represented by the pulse height of the differentiated signal. A threshold detector 13, set to a level for each of the positive and negative pulses 14 and 15, digitizes the fault information. In a pulse-shaping stage 18, for example a monostable flip-flop, the signals 16 and 17 are brought to a level which enables further evaluation of the digital fault information to be carried out.

At high recording frequencies, the above-described embodiment has the disadvantage that the peak rectifier 7 and the filter 9 following it do not reproduce the shape of dropout 10 in the read signal 4 very exactly.

This problem is overcome by the embodiment shown in FIG. 4.

The rectified read signal 6 is supplied, at point B' corresponding to point B in FIG. 3, to a threshold detector 13 having threshold stages D1-Dn whose voltage thresholds X1-Xn are set at fixed levels. In the circuit shown in FIG. 4, there are 9 threshold stages D1-D9 having voltage thresholds X1 to X9 of 90% to 10% respectively. If the signal exceeds the threshold $X_x$ at one of the detectors $D_x$, the output of the detector $D_x$ switches from logic 0 to logic 1 and activates a re-triggerable monostable flip-flop $Mf_x$ which thus remains in its normal state (output logic 1). If the threshold $X_x$ is not exceeded, the jump from logic 0 to logic 1 at $D_x$ is missing and $Mf_x$ changes to its other state (output logic 0). The lower the level of the read signal 6, the fewer detectors $D_x$ will switch to logic 1 and cause the associated monostable flip-flops $Mf_x$ to retain their (output logic 1) states. After a time $T_1$ to $T_n$ has elapsed, the respective states of all monostable flip-flops $Mf_1-Mf_n$ can be sampled and appropriately stored, for example in a register R. The register stages allocated to times $T_1$ to $T_n$ contain the instantaneous amplitudes of the read signal 6 over the whole period represented by the sum of $T_1$ to $T_n$. $T_1$ to $T_2$, etc. correspond exactly to half the period of the test signal.

In FIG. 4, the read signal 6 is for example at maximum strength (100% P) during periods $T_1$ and $T_2$, i.e. all threshold detectors D1-D9 have switched and thus caused all monostable flip-flops Mf1-Mf9 to remain in the logic 1 state. However, during the period $T_2$ to $T_3$ the thresholds $X_1=90\%$ and $X_2=80\%$ P are not exceeded, the re-triggering signals for the two monostable flip-flops $Mf_2$ and $Mf_1$ concerned are not generated and the said flip-flop therefore change state and, after sampling, a 0 is written in each case into the register R. In the period $T_3$ to $T_4$, the read signal 6 is again at maximum strength, which is why the register only contains logic 1 states. Drops in signal strength occur again during periods $T_4$ to $T_5$ and $T_5$ to $T_6$, and appropriate pulses are applied to the register. The periods $T_6$ to $T_7$ and $T_7$ to $T_8$ are again without faults, i.e. the read signal is at maximum strength. The results obtained are now evaluated in such a manner that the contents of successive pairs of register stages R1-R8 are compared with each other. Any non-agreement is registered. The greater the number of register stage contents which do not agree, the greater the differential at the location of the dropout.

In the embodiment of FIG. 4, differences Δ between the contents of register stages R1 and R2, R2 and R3 and so forth are obtained which correspond to the values 0224220. The dropout therefore occurred between T2 and T6 and was at a maximum in the period T4 to T5. The differential is therefore relatively large, which can be seen from the number and magnitudes of the indicated values Δ; the magnitude of the differential is a criterion for the seriousness of the fault. It is apparent to the skilled worker that the more thresholds X, time intervals ΔT and register stages R are used, the better the contour of the dropout can be reproduced. In practice, about 20 threshold stages and the corresponding number of storage stages are adequate. The differential of the envelope can thus be detected sufficiently well.

Even if the phase relationship of the read signal 6 is not disturbed, i.e. if a relatively shallow dropout occurs which can be characterized by small amplitude differences in the storage stages, for example 0112120, the read operation can still be disturbed because of the poor signal/noise ratio (S/N ratio). This is the case when a dropout causes a considerable drop in the nominal read signal strength P. For more reliable fault detection and evaluation it is therefore necessary to take this possibility into consideration, too.

A variant of the method according to the invention for improved fault detection and evaluation can be carried out using the circuit arrangement shown in FIG. 5.

In FIG. 5, apart from the dropout detecting and evaluating circuit 20 shown in FIGS. 3 and 4, which can in principle contain one or more threshold detectors and a counting and/or indicating device, a further threshold detector 21 connected in parallel is provided behind the amplifier 3. The outputs of the stages 20 and 21 are connected to each other by an OR-gate 22, so that both output signals can be used for fault evaluation. The further threshold detector 21 processes the non-differentiated signal directly, by which means dropouts can be additionally reliably detected and evaluated.

FIG. 6 shows a drop-in detecting circuit arrangement in the read circuit of which the linear amplifier 3 is followed by a non-linear amplifier 23 which amplifies the signal as a function of its amplitude, the signal being preferably amplified exponentially. At this point it should be emphasized again that the test signal has been erased by means of a DC erasing device 2A, FIG. 6, and the noise signal is read as a read signal.

In this arrangement, low-level input read signals are amplified to a lesser degree than those with a high level. The amplifier 23 is again followed by a threshold detector 24, at the output Ou of which the signals exceeding a predetermined level are identified as errors. The error values can be stored and/or indicated by means of suitable storage and/or indicating devices which can be connected to the output, and are thus available for, inter alia, initialization of the recording medium.

In a further, very advantageous embodiment of the invention, the drop-in detecting circuit arrangement of FIG. 6 is connected in parallel with the dropout detecting circuit arrangement of FIG. 5 (cf. FIG. 7).

The two circuit arrangements can of course only be operated consecutively since, for the detection of dropouts, test signals must be written and, for the detection of drop-ins, these test signals must first be erased by means of the DC erasing device 2A, FIG. 7. An area or a track on the recording medium must therefore be scanned twice. However, the results obtained in the two scanning operations can be combined in a further OR-gate 25; and supplied as a joint result, to a suitable register 26 for evaluation and further processing.

We claim:

1. A method of detecting and evaluating dropouts in recording media, particularly magnetic data recording media, having digital signals recorded on at least one track, wherein the digital signals are read and rectified to form an envelope, and the envelope is differentiated, the magnitude of the pulses resulting from the differentiation, which represents the rate of change of the dropout and serves as a criterion for the seriousness of the dropout, being registered.

2. A method as claimed in claim 1, wherein the pulses resulting from the differentiation of said envelope are evaluated in a threshold detector having adjustable threshold stages.

3. A method as claimed in claim 2, wherein the non-differentiated read digital signal in addition is directly fed to another threshold detector so that drop-outs having a very small signal-to-noise ratio can be detected.

4. A method as claimed in claim 1, wherein the individual pulses of the read and rectified digital signal are fed to a large number of adjustable threshold stages and the differential of the envelope is determined by comparing the amplitudes of successive ones of said resulting pulses.

* * * * *